(12) United States Patent
Peterson (10) Patent No.: US 7,296,903 B2
(45) Date of Patent: Nov. 20, 2007

(54) EXTERIOR REARVIEW MIRROR MECHANISM FOR A SKID LOADER

(76) Inventor: Iver Peterson, 13021 Sunset Trail, Pine City, MN (US) 55063

( * ) Notice: Subject to any disclaimer, the term of this patent is extended or adjusted under 35 U.S.C. 154(b) by 0 days.

(21) Appl. No.: 11/348,916

(22) Filed: Feb. 7, 2006

(65) Prior Publication Data

US 2006/0176592 A1   Aug. 10, 2006

Related U.S. Application Data

(60) Provisional application No. 60/650,493, filed on Feb. 7, 2005.

(51) Int. Cl.
  *G02B 5/08*  (2006.01)
  *G02B 5/10*  (2006.01)
  *G02B 7/182* (2006.01)
  *B60R 1/06*  (2006.01)

(52) U.S. Cl. .................. 359/841; 359/844; 359/868; 359/871; 359/900; 296/1.11; 296/190.01

(58) Field of Classification Search ............... 359/871, 359/872, 881, 841, 844, 868, 900; 248/475.1, 248/476, 479, 480, 481; 296/1.11, 190.01; 37/411
See application file for complete search history.

(56) References Cited

U.S. PATENT DOCUMENTS

| | | | | |
|---|---|---|---|---|
| 552,552 | A * | 1/1896 | Schofield | 111/200 |
| 1,750,947 | A * | 3/1930 | Vons | 248/486 |
| 1,858,515 | A * | 5/1932 | Lyon | 248/475.1 |
| 2,100,938 | A * | 11/1937 | Brandt | 359/872 |
| 2,113,251 | A * | 4/1938 | Dover | 248/480 |
| 2,226,482 | A | 12/1940 | Sarnes | |
| 2,573,443 | A * | 10/1951 | Holland | 248/480 |
| 2,636,418 | A * | 4/1953 | Leonard | 248/478 |
| 2,732,764 | A * | 1/1956 | Parks | 248/480 |
| 3,059,790 | A * | 10/1962 | Augustus | 414/546 |
| 4,163,606 | A * | 8/1979 | Granno | 359/881 |
| 4,172,638 | A * | 10/1979 | Freedman | 359/863 |
| 4,185,867 | A | 1/1980 | Schmidt et al. | |
| 4,309,142 | A | 1/1982 | Shumaker | |
| 4,379,568 | A | 4/1983 | Kerkman | |
| 4,436,374 | A * | 3/1984 | Krueger | 359/850 |
| 4,500,063 | A | 2/1985 | Schmidt et al. | |
| 5,106,049 | A | 4/1992 | Schmidt et al. | |
| 5,342,015 | A | 8/1994 | Burton et al. | |
| 5,576,900 | A | 11/1996 | Baumler et al. | |
| 6,149,228 | A | 11/2000 | O'Neill et al. | |
| 6,239,926 | B1 * | 5/2001 | De Shazer | 359/841 |

(Continued)

FOREIGN PATENT DOCUMENTS

JP    10-046632    *    2/1998

(Continued)

*Primary Examiner*—Ricky D. Shafer
(74) *Attorney, Agent, or Firm*—Dicke, Billig & Czaja, PLLC (57) ABSTRACT

An exterior rearview mirror mechanism for a skid loader includes a support and a mirror attached to the support. The support is configured to extend from a movable lifting arm of the skid loader, and the mirror is attached to the support opposite the movable lifting arm and positioned to enable an operator of the skid loader to visualize substantially an entirety of a tail swing path on either rear side of the skid loader.

20 Claims, 9 Drawing Sheets

U.S. PATENT DOCUMENTS 6,302,550 B1    10/2001  Krieg
6,846,036 B2 *   1/2005  Stone .................... 296/190.08
2005/0254152 A1* 11/2005  Houdyshell ................. 359/872

FOREIGN PATENT DOCUMENTS

JP          2001-122592   *  5/2001
JP          2002-87780    *  3/2002
JP          2004-359168   *  12/2004

* cited by examiner

EXTERIOR REARVIEW MIRROR MECHANISM FOR A SKID LOADER

CROSS-REFERENCE TO RELATED APPLICATIONS

This Non-Provisional Utility Patent Application claims the benefit of the filing date of U.S. Provisional Patent Application Ser. No. 60/650,493, filed Feb. 7, 2005, entitled "EXTERIOR REARVIEW MIRROR MECHANISM FOR A SKID LOADER," which is incorporated herein by reference.

BACKGROUND

Skid loaders are highly maneuverable vehicles and have proven useful in the construction, demolition, and landscaping fields due to their ease of control and ability to access cramped construction sites.

A skid loader is a vehicle having at least one pair of opposing tracks/wheels. The opposing tracks/wheels can be moved independently such that the skid loader can be turned through a very tight turning radius. For example, a skid loader can be turned on its lengthwise axis from a forward facing position to a rear facing position by moving one set of tracks in a rearward direction and the other opposing set of tracks in a forward direction. Thus, skid loaders are highly maneuverable and are said to have a "zero turning radius," which is beneficial for working inside of buildings and on other sites that have limited working space.

The high degree of maneuverability permits skid loaders to "turn on a dime." However, it is often difficult for a seated operator of a skid loader to adequately visualize the environment around the skid loader. Since skid loaders are often employed in developing neighborhoods and on congested construction sites, there is a risk that the skid loader might be turned/swung into an object (or even a person) on the site. Thus, while a skid loader is highly maneuverable, the operator must exercise care to prevent swinging the rear end of the skid loader into unseen objects or people on the construction site.

For these and other reasons, there is a need for the present invention.

SUMMARY

One aspect of the present invention provides an exterior rearview mirror mechanism for a skid loader. The exterior rearview mirror mechanism includes a support and a mirror attached to the support. The support is configured to extend from a movable lifting arm of the skid loader, and the mirror is attached to the support opposite the movable lifting arm and positioned to enable an operator of the skid loader to visualize substantially an entirety of a tail swing path on either rear side of the skid loader.

Another aspect of the present invention provides an exterior rearview mirror mechanism for a skid loader. The exterior rearview mirror mechanism includes a support and a mirror attached to the support. The support is configured to extend from a lifting arm assembly of the skid loader, and the mirror is attached to the support opposite the lifting arm assembly and positioned to enable an operator of the skid loader to visualize substantially an entirety of a tail swing path on either rear side of the skid loader.

Another aspect of the present invention provides a method of equipping a skid loader. The method includes providing an exterior rearview mirror mechanism. The method additionally includes attaching the exterior rearview mirror mechanism to a lifting arm assembly of the skid loader to enable a seated operator of the skid loader to visualize substantially an entirety of a tail swing path on either rear side of the skid loader.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings that form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Various embodiments of the present invention can be implemented on skid loaders. In general, a skid loader is a vehicle having at least one pair of opposing tracks/wheels. The opposing tracks/wheels can be moved independently such that the opposing tracks/wheels can be moved in opposing directions. As a result, skid loaders can be turned through a very tight turning radius and are said to "turn on a dime." As a point of reference, when the opposing tracks/wheels are moved in opposing directions, the opposing tracks/wheels can skid or slide as the skid loader turns. In the following detailed description, the term skid loader refers to vehicles having the above characteristics and includes, for example, track loaders, all-wheel steer loaders, skid-steers, and ride on/walk behind mini-track loaders. To this end, a skid loader is very different from a tractor or a truck, and the tight turning radius of the skid loader presents unique operational challenges to operators and users.

Figure 1:
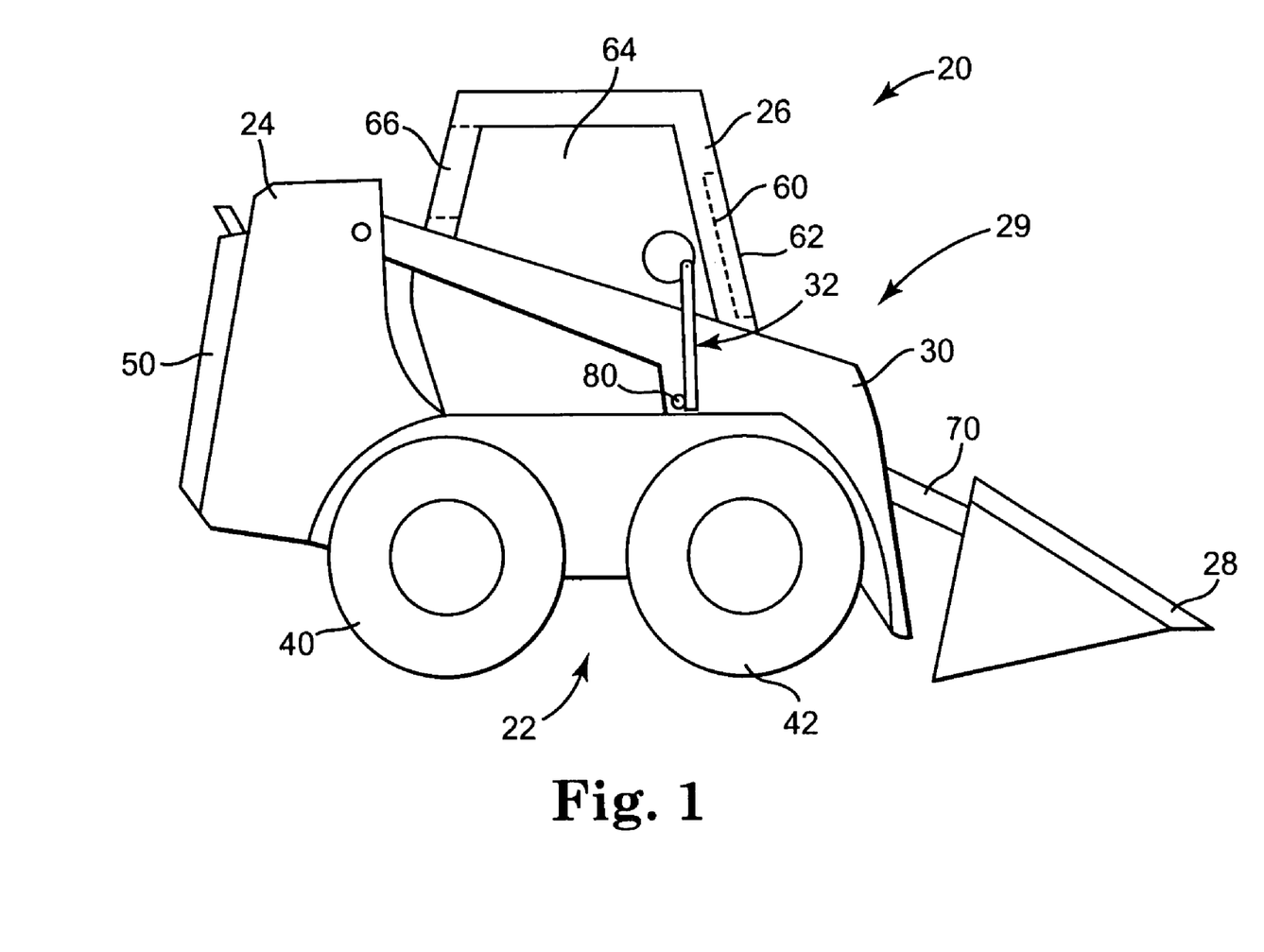
FIG. 1 illustrates a side view of a skid loader including an exterior rearview mirror mechanism extending from a movable lifting arm of the skid loader according to one embodiment of the present invention.

With this terminology in mind, FIG. 1 illustrates a side view of a skid loader 20 according to one embodiment of the present invention. Skid loader 20 includes movement means 22, a housing 24, a cab 26, a bucket 28, a lifting arm assembly 29 including opposing lifting arms 30 extending from the housing 24, and an exterior rearview mirror mechanism 32 coupled to and extending from at least one of the lifting arms 30. Exterior rearview mirror mechanism 32 is a safety device that enables an operator in skid loader 20 to visualize substantially an entirety of a tail swing path on either rear side of skid loader 20, as described in detail below.

Movement means 22 is configured to move skid loader 20 in response to inputs from an operator (not shown) within cab 26. In one embodiment, movement means 22 includes a first pair of wheels 40 and a second pair of wheels 42. In an alternate embodiment, movement means 22 includes a pair of tracks coupled on either side of skid loader 20. In any regard, movement means 22 is configured to translate and/or turn skid loader 20 in response to operator commands.

Housing 24 is positioned to the rear of cab 26 and in one embodiment encloses a motor (not shown) adapted for powering skid loader 20. In a preferred embodiment, ballast 50 is coupled to housing 24 to counteract (i.e., balance) mass carried by bucket 28. Ballast 50 is optional, and when included, is coupled to a rear portion of housing 24.

Cab 26 is disposed above movement means 22 and positioned between the opposing lifting arms 30. In one embodiment, a door 60 is formed within a front 62 of cab 26 to permit an operator (not shown) to enter and exit skid loader 20 from the front 62. In addition, cab 26 includes side windows 64 and a back window 66 positioned to afford the operator a view exterior cab 26. In one embodiment, an exterior region of each of windows 64, 66 is covered by a protective screen (not shown) that guards windows 64, 66 against potential breakage caused by falling and/or shifting objects.

Bucket 28 is coupled to lifting arms 30 and includes a piston 70 adapted to actuate movement of bucket 28. In one embodiment, bucket 28 is a scoop. However, it is to be understood that bucket 28 can generally include a dozer, a ram, a post-hole digger, or other implements attachable to lifting arms 30. Bucket 28 is moved vertically via movement from lifting arms 30 and can be actuated to tilt, for example in a dumping motion, by a movement of piston 70.

Lifting arms 30 (one shown) include a lifting lug 80 configured for the attachment of lifting means (not shown, but would include, for example, hydraulic lines) contained within lifting arms 30. In one embodiment, exterior rearview mirror mechanism 32 is coupled to an exterior surface of lifting lug 80 to enable an operator (not shown) situated within cab 26 to visualize a tail swing path on either rear side of skid loader 20, as further described below. Lifting arms 30 are movable, and can, for example, move up (relative to the orientation of FIG. 1) in raising a load contained within bucket 28. In one embodiment, lifting arms 30 are extensible and are configured to move a load and/or an implement attached to lifting arms 30 inward and/or outward relative to cab 26. In any regard, it has been surprisingly and unexpectedly discovered that mounting exterior rearview mirror mechanism 32 to movable lifting arms 30 enables an operator (not shown) situated within cab 26 to visualize a tail swing path on either rear side of skid loader 20 even as lifting arms 30 are moved through a variety of positions.

Figure 2:
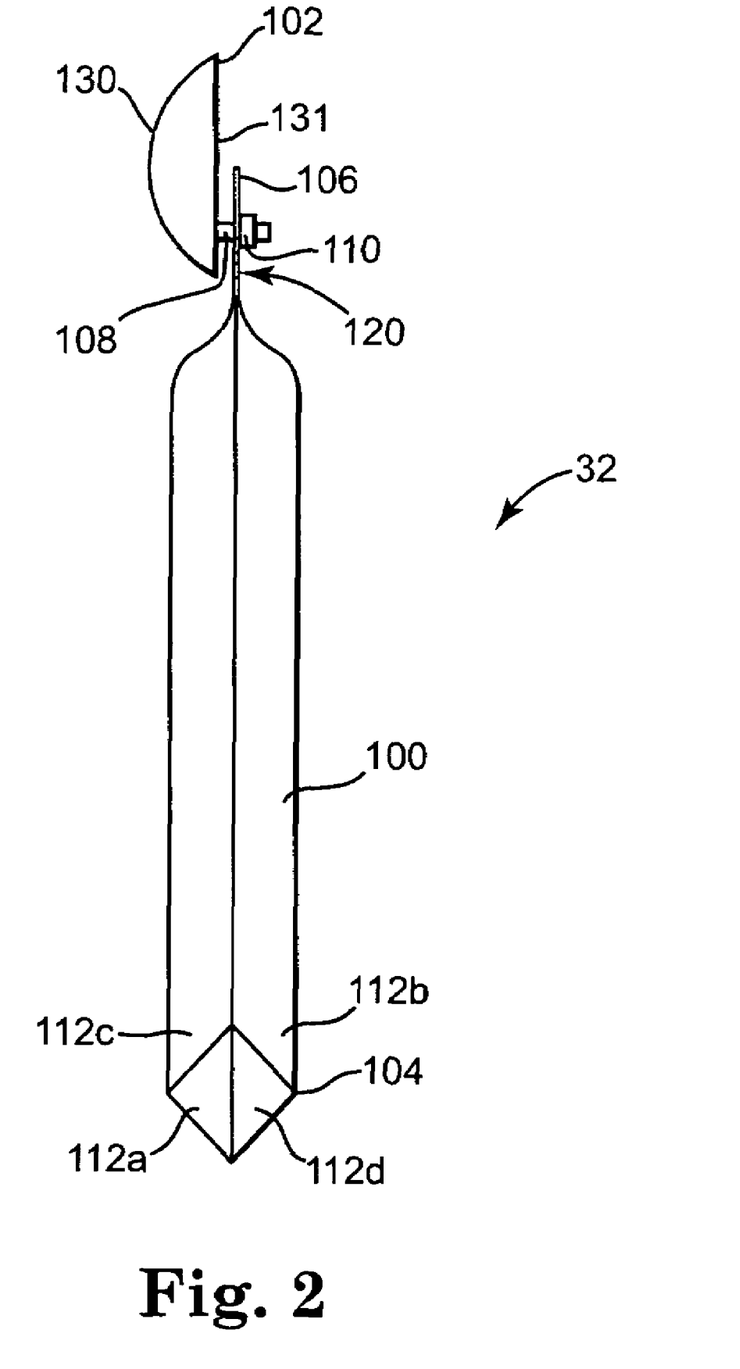
FIG. 2 illustrates an inclined side view of an exterior rearview mirror mechanism including a convex mirror according to one embodiment of the present invention.

FIG. 2 illustrates an inclined side view of exterior rearview mirror mechanism 32 illustrated in FIG. 1 and according to one embodiment of the present invention. Exterior rearview mirror mechanism 32 includes a support 100 and a mirror 102. Support 100 includes an arm end 104 and a mirror end 106. In one embodiment, mirror end 106 defines a bore (occupied) configured to receive a bolt 108 projecting from mirror 102. In this regard, a nut 110 is shown fastened to bolt 108 to secure mirror 102 to mirror end 106 of support 100.

In one embodiment, support 100 is an annular tube defining a first pair of opposing sides 112a and 112b, and a second pair of opposing sides 112c and 112d. In one embodiment, one of the pair of opposing sides, for example opposing sides 112a, 112b is collapsed such that the other pair of opposing sides 112c, 112d buckles at mirror end 106 to form a flat plate 120. Flat plate 120 is rigid and thin and configured to support mirror 102. In one embodiment, the pair of opposing sides 112a, 112b is collapsed and a bore is simultaneously formed in flat plate 120 on mirror end 106. For example, in one example of this embodiment mirror end 106 of support 100 is inserted into a press, the press is actuated to collapse opposing sides of support 100 to form flat plate 120, and a punch is subsequently actuated to form a bore hole in flat plate 120. Support 100 can be formed of any malleable and rigid material. For example, in one embodiment support 100 is an annular metal tube made of soft steel.

Mirror 102 is attachable to mirror end 106 of support 100. In one embodiment, mirror 102 preferably includes bolt 108 projecting from one side of mirror 102. In one embodiment, mirror 102 is a convex mirror defining a convex surface 130 opposite aback side 131, where back side 131 is a support frame for mirror 102 and is formed of plastic. In one embodiment, bolt 108 projects from back side 131 and is offset from a center of mirror 102.

Figure 3:
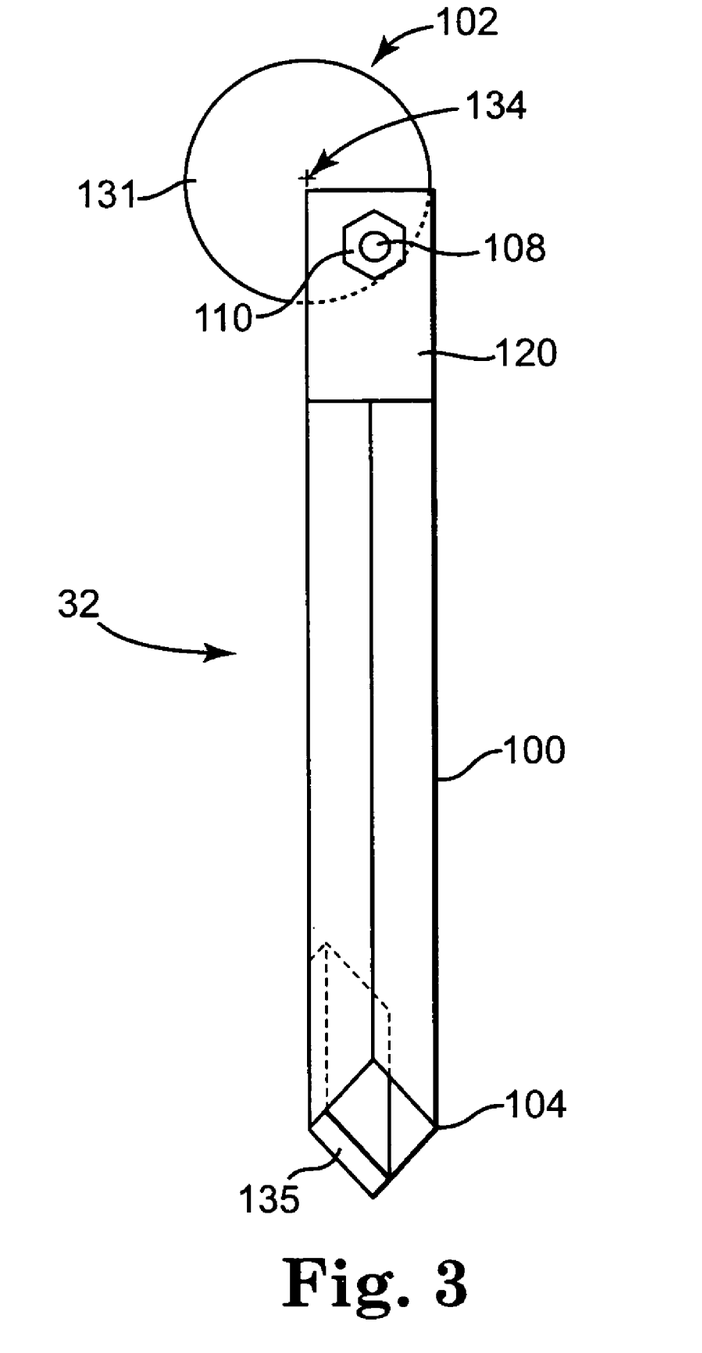
FIG. 3 illustrates an inclined view of a back of the exterior rearview mirror mechanism illustrated in FIG. 2.

FIG. 3 illustrates an inclined view of a back of exterior rearview mirror mechanism 32 illustrated in FIG. 2 in accordance with one embodiment of the present invention. Mirror 102 defines a central axis 134 and bolt 108 is offset from central axis 134. When mirror 102 is coupled to support 100, mirror 102 can be rotated about bolt 108 relative to central axis 134. In this manner, mirror 102 can be moved (i.e., canted) relative to support 100 in providing a variable field of view.

Arm end 104 is shown as an annular tube in an uncollapsed state. In an alternate embodiment, arm end 104 is collapsed in a manner similar to the collapse described above for mirror end 106. In any regard, in one embodiment arm end 104 is configured for attachment to lifting arm 30 (FIG. 1) or, more specifically, directly to lifting lug 80 (FIG. 1) of lifting arm 30. Arm end 104 can be attached to lifting arm 30 or lifting lug 80 by, for example, welding, clamping, quick-release mechanisms, mechanical attachment by a bolt, magnetic attachment, and/or adhesive attachment. For example, in one embodiment arm end 104 includes a magnet 135 that enables arm end 104 to be magnetically attached directly to a metal surface of lifting arm 30 (FIG. 1).

Figure 4:
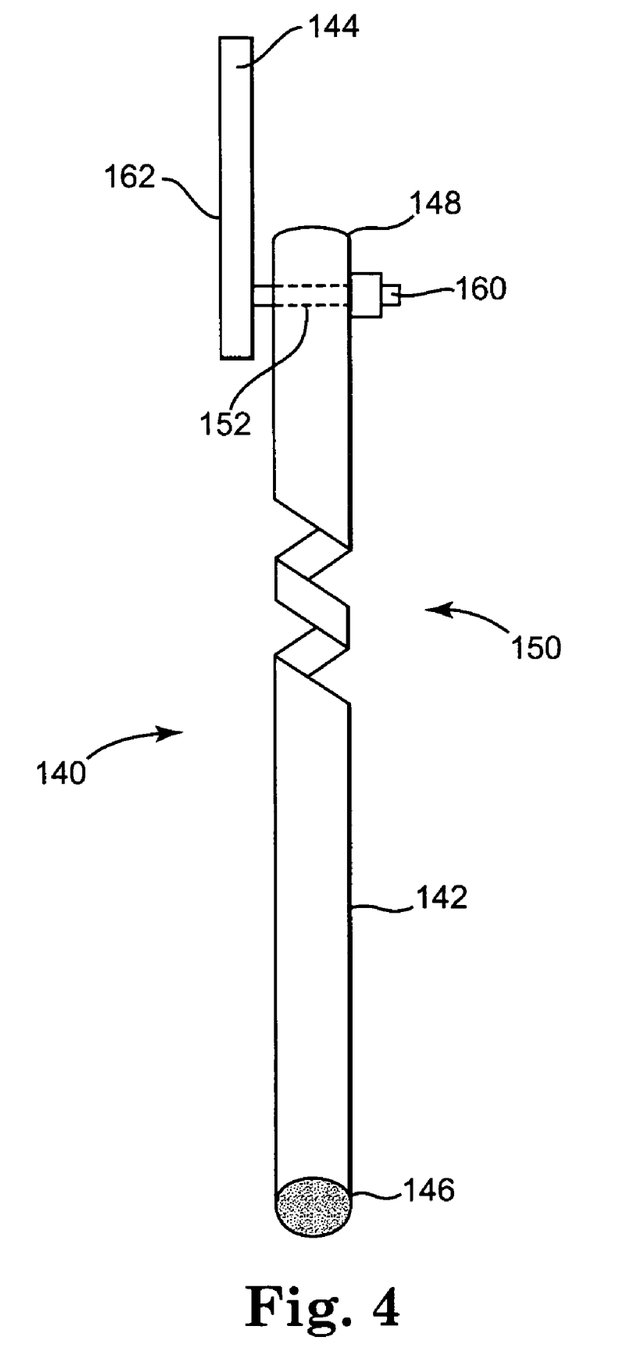
FIG. 4 illustrates an inclined side view of an exterior rearview mirror mechanism according to one embodiment of the present invention.

FIG. 4 illustrates an inclined side view of an exterior rearview mirror mechanism 140 according to one embodiment of the present invention. Exterior rearview mirror mechanism 140 includes a support 142 and a mirror 144. Support 142 defines an arm end 146, a mirror end 148, and a vibration dampener 150 disposed between arm end 146 and mirror end 148.

With reference to FIG. 1, in one embodiment support 142 is coupled to lifting lug 80 and extends from lifting arm 30. In one embodiment, support 142 is coupled directly to lifting arm 30. In this regard, support 142 can extend upward from lifting arm 30 (relative to the orientation of FIG. 1), or support 142 can extend generally downward from lifting arm 30. In any regard, in one embodiment arm end 146 is a solid metal bar stock suitable for welding to lifting arm 30 or lifting lug 80. Vibration dampener 150 is configured to dampen oscillatory vibrations transferred through lifting arm 30 in stabilizing an optical image in mirror 144. For example, in one embodiment vibration dampener 150 is a spring integrally formed within support 142. In an alternate embodiment, vibration dampener 150 is a separate mass movably coupled to support 142 and configured to be selectively fixed along a length of support 142. In any regard, vibration dampener 150 minimizes distortion of the optical image formed within mirror 144.

Support 142 defines a bore 152 formed in mirror end 148 that is sized to accept a bolt 160 projecting from mirror 144. In this regard, mirror 144 includes a mirror surface 162 and bolt 160 projects from a surface opposite of mirror surface 162. Mirror surface 162 can be a planar mirror surface, a convex mirror surface, or a concave mirror surface. In one embodiment, mirror surface 162 is a planar mirror surface such that mirror 144 is a flat mirror.

Figure 5:
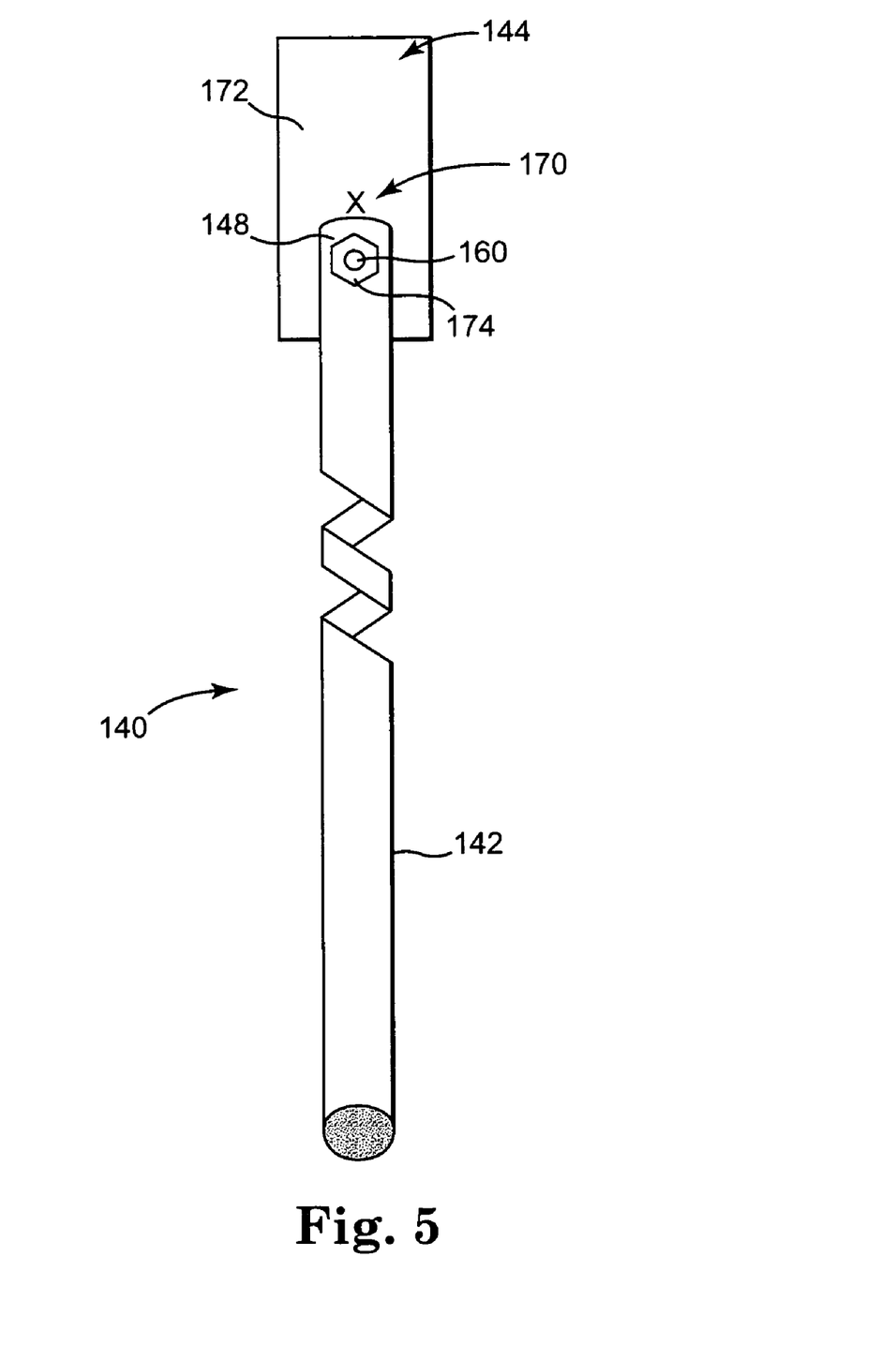
FIG. 5 illustrates an inclined view of a back of the rearview mirror mechanism illustrated in FIG. 4.

FIG. 5 illustrates an inclined view of a back of the exterior rearview mirror mechanism 140 illustrated in FIG. 4. Mirror 144 includes bolt 160 that is preferably offset from a central axis 170 of mirror 144. In this regard, bolt 160 is an offset bolt extending from a back surface 172 of mirror 144 and is displaced a distance from central axis 170. A nut 174 is shown coupled to bolt 160 to fix mirror 144 to mirror end 148 of support 142. When mirror 144 is coupled to support 142, mirror 144 can be rotated about bolt 160 relative to central axis 170 such that mirror 144 can be canted relative to support 142 in providing a variable field of view.

Figure 6:
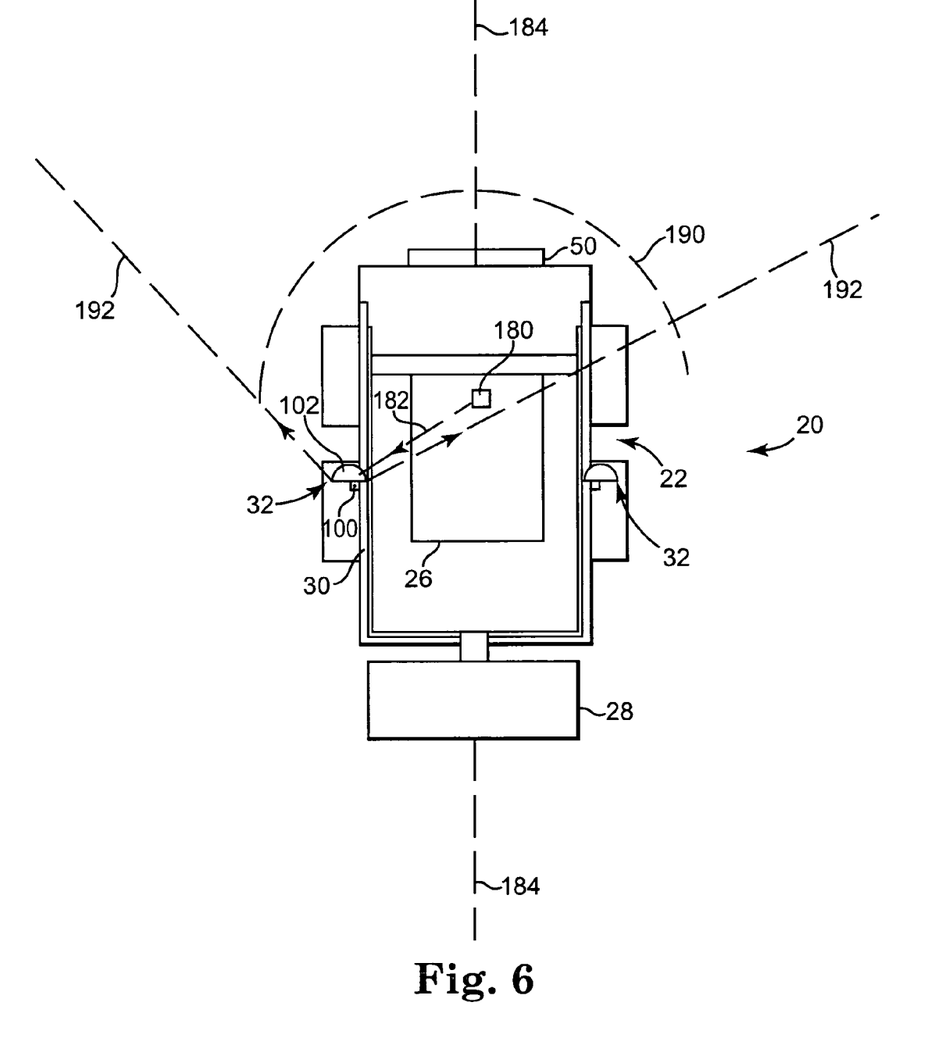
FIG. 6 illustrates a top view of a skid loader including two exterior rearview mirror mechanisms positioned to enable visualization of substantially an entirety of a tail swing path on either rear side of the skid loader according to one embodiment of the present invention.

FIG. 6 illustrates a top view of skid loader 20 including two exterior rearview mirror mechanisms 32 positioned to enable visualization of substantially an entirety of a tail swing path 190 on either rear side of skid loader 20 in accordance with one embodiment of the present invention. In this regard, FIG. 6 is a simplified, overhead view of skid loader 20 illustrated in FIG. 1. Operation of skid loader 20 and use of exterior rearview mirror mechanisms 32 will be described with additional reference to FIG. 2. An operator 180 is shown schematically positioned within cab 26 and is associated with a sight line 182 to mirror 102 of exterior rearview mirror mechanism 32. A centerline 184 of skid loader 20 is shown bisecting bucket 28 and ballast 50. In this regard, operator 180 is positioned along centerline 184, although other positions for operator 180 within cab 26 are equally acceptable.

Movement means 22 of skid loader 20 are independently operable between forward and reverse movements. In this regard, skid loader 20 can be moved forward in the direction of bucket 28, or reversed in the direction of ballast 50. In addition, movement means 22 can be independently controlled to swing skid loader 20 about centerline 184. As a point of reference, skid loader 20 can be turned tightly (i.e., in a zero turn radius) and spun about its centroid by driving wheels 40, 42 on one side in a forward direction and wheels 40, 42 on the opposite side in a rearward direction. A tail swing path 190 is illustrated to the rear of skid loader 20 representing a turning radius that skid loader 20 swings through when sharply turned about centerline 184.

Movement of skid loader 20 to the rear and/or along tail swing path 190 occurs behind operator 180. Thus, rearward movement of skid loader 20 is not in the operator's natural line-of-sight. However, as illustrated in FIG. 6, operator 180 has a sight line 182 to mirror 102 that provides a vision cone 192 projected to the rear of skid loader 20. In this manner, exterior rearview mirror mechanism 32 is a safety device, that when mounted to skid loader 20, includes a mirror 102 that provides a vision cone 192 that enables a seated operator 180 to visualize substantially an entirety of tail swing path 190 to the rear of skid loader 20. In contrast, some skid loaders have conventional mirrors mounted inside the cab of the skid loader that provide only a limited, shoulder height and above rear view of the skid loader, and provide almost no view of a periphery of the tail swing path of a rotating skid loader.

In at least one embodiment, a pair of exterior rearview mirror mechanisms 32 is mounted on either side of skid loader 20 as illustrated in FIG. 6. With additional reference to FIG. 1, supports 100 are mounted to lifting arms 30 and are configured to provide operator 180 with sight lines 182 to mirrors 102 even when lifting arms 30 are elevated. In this manner, each of exterior rearview mirror mechanisms 32 provide a vision cone 192 (only one shown to minimize complexity of the illustration) of substantially an entirety of tail swing path 190, such that a combination of two vision cones 192 from two exterior rearview mirror mechanisms 32 result in a full rear-field view encompassing an entirety of the tail swing path 190.

During use, and in particular during rearward movement of skid loader 20, operator 180 is able to view almost the entire tail swing path 190 in safely operating skid loader 20, including the ground and the area adjacent to the wheels/tracks of loader 20. In addition, exterior rearview mirror mechanisms 32 can be viewed even when lifting arms 30 are raised and bucket 28 is actuated. Exterior rearview mirror mechanisms 32 can be employed by the operator 180 to watch for children potentially attracted to the use of skid loader 20, and to monitor other persons or objects positioned behind skid loader 20 at the project site.

Figure 7:
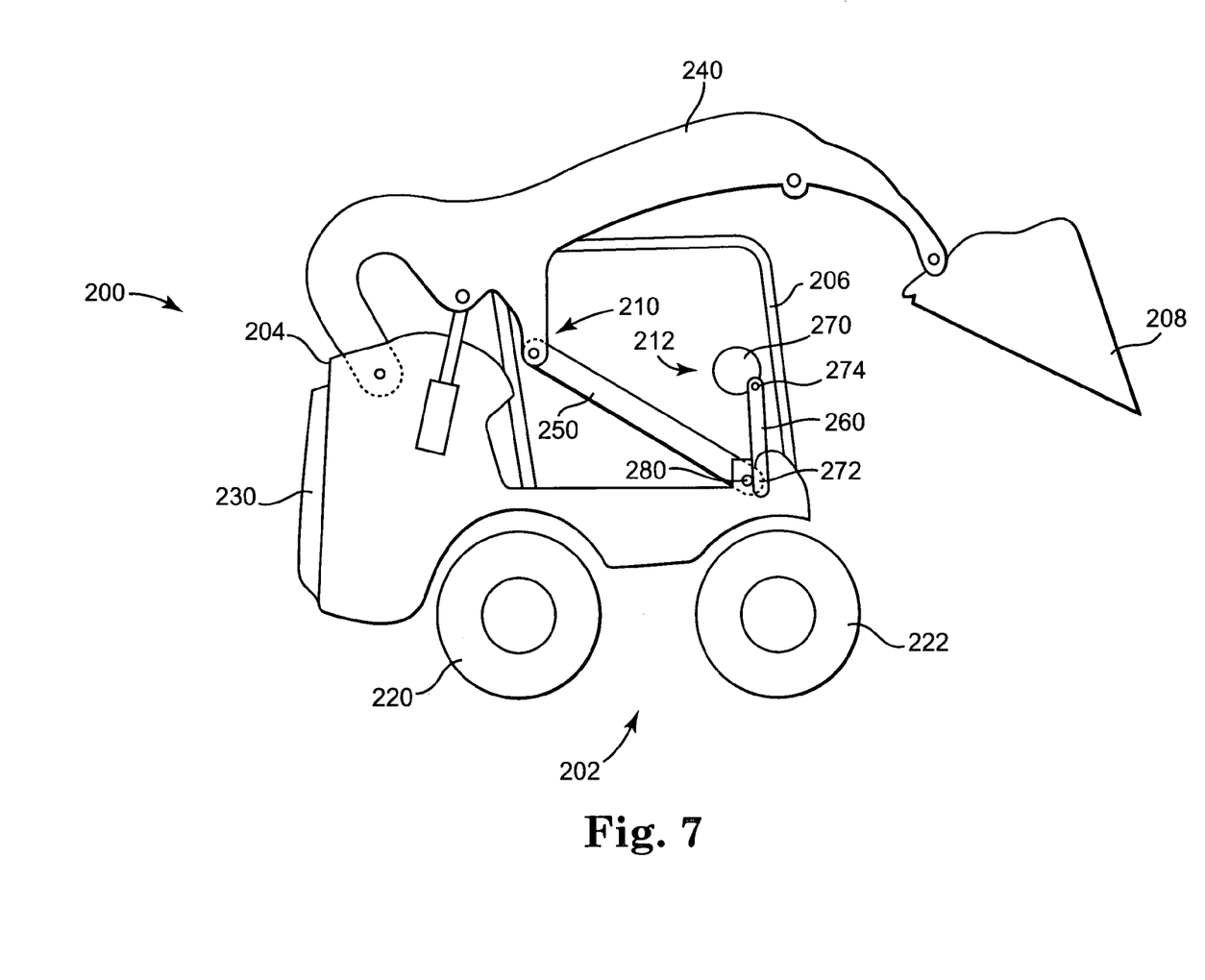
FIG. 7 illustrates a side view of a skid loader including an exterior rearview mirror mechanism extending from a lifting arm assembly of the skid loader according to one embodiment of the present invention.

FIG. 7 illustrates a side view of a skid loader 200 according to one embodiment of the present invention. Skid loader 200 includes movement means 202, a housing 204, a cab 206, a bucket 208, a lifting arm assembly 210 extending from the housing 204, and an exterior rearview mirror mechanism 212 coupled to and extending from lifting arm assembly 210.

Movement means 202 is similar to movement means 22 described above. In this regard, in one embodiment, movement means 202 includes a first pair of wheels 220 and a second pair of wheels 222. In an alternate embodiment, movement means 202 includes a pair of tracks coupled on either side of skid loader 200. In any regard, movement means 202 is configured to translate and/or turn skid loader 200 in response to operator commands.

Housing 204 is positioned to the rear of cab 206 and in one embodiment encloses a motor (not shown) adapted for powering skid loader 200. In one embodiment, lifting arm assembly 210 is configured to move through a vertical lift path in moving heavy loads, for example bricks, and includes a ballast 230 coupled to housing 204 to counteract (i.e., balance) a load carried by bucket 28. Ballast 230 is optional, and when included, is coupled to a rear portion of housing 204.

Lifting arm assembly 210, in one embodiment, includes a movable lifting arm 240 and a support structure 250. In general, lifting arm 240 is movable and is configured to lift bucket 208 through a vertical lift path. In one embodiment, lifting arm 240 can raise bucket 208 above cab 206. In general, support structure 250 moves in a piston-like manner and provides structural support to the movable lifting arm 240.

Exterior rearview mirror mechanism 212 is similar to exterior rearview mirror mechanism 32 described above, and in one embodiment includes a support 260 and a mirror 270. Support 260 includes an arm end 272 and a mirror end 274. Mirror end 274 defines a bore (occupied) configured to receive a bolt (not shown) projecting from mirror 270.

In one embodiment illustrated in FIG. 7, arm end 272 is coupled to support structure 250 of lifting arm assembly 210 and is positioned to enable an operator (not shown) within cab 206 to visualize substantially an entirety of a tail swing path on either rear side of the skid loader. In general, support structure 250 provides structural support to the movable lifting arm 240. In one embodiment, support structure 250 defines a pivot point 280 and arm end 272 is coupled to a projection of pivot point 280. Pivot point 280 defines a substantially fixed portion of support structure 250, and is, in one embodiment disposed along an axis of support structure 250 of lifting arm assembly 210.

Figure 8:
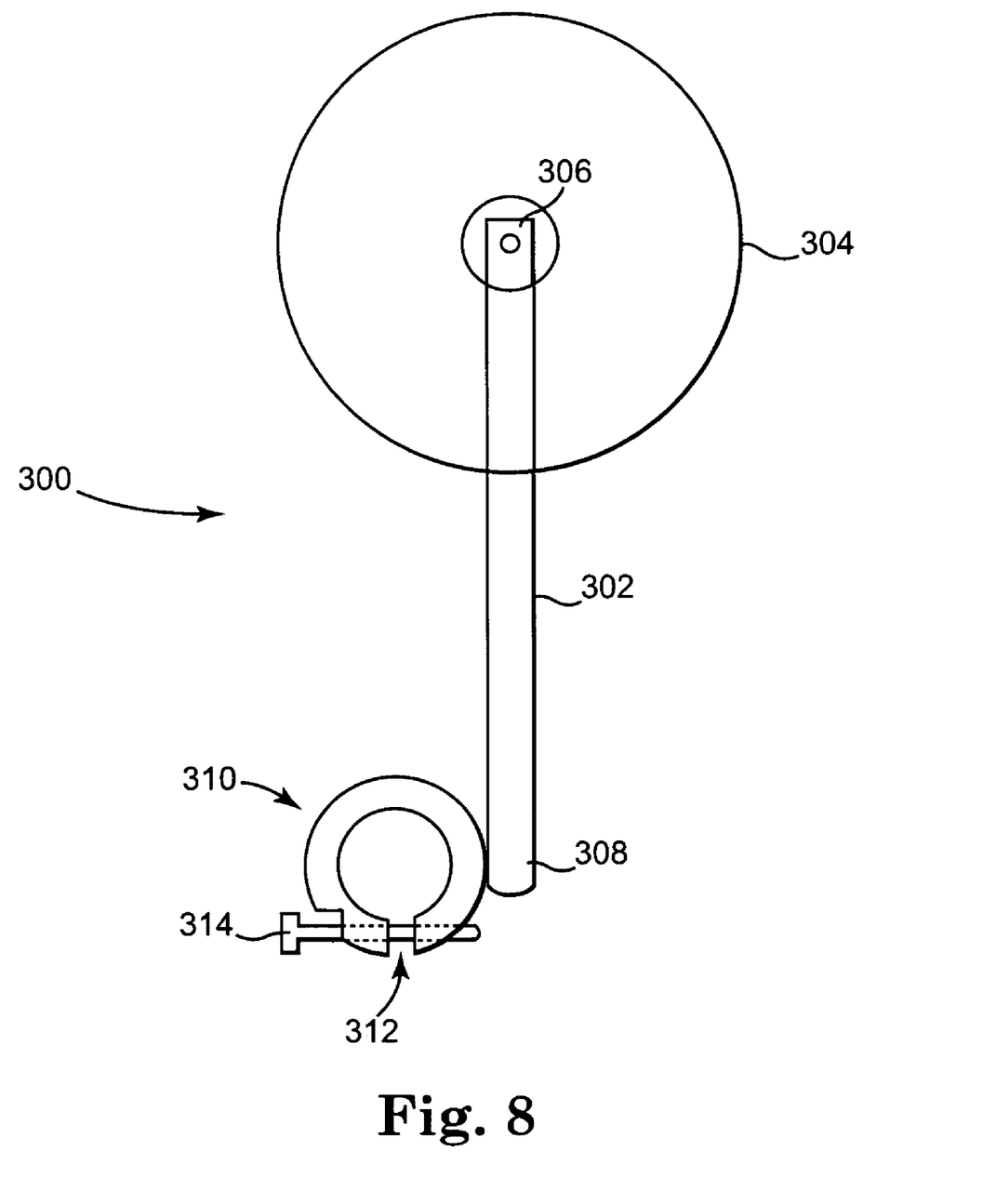
FIG. 8 illustrates a view of an exterior rearview mirror mechanism including an annular ring coupled to an arm end of a support.

FIG. 8 illustrates an exterior rearview mirror mechanism 300 according to another embodiment of the present invention. Exterior rearview mirror mechanism 300 includes a support 302 and a mirror 304 coupled to support 302. Support 302 includes a mirror end 306 and an arm end 308 opposite of the mirror end 306, and an annular ring 310 coupled to arm end 308. In one embodiment, annular ring 310 defines a gap 312 and includes a closure mechanism 314 that extends across gap 312. In one embodiment, annular ring 310 is welded to arm end 308, and closure mechanism 314 includes a bolt threaded into at least a portion of annular ring 310. In general, annular ring 310 is configured to frictionally fit over locking lug 80 (FIG. 1) and closure mechanism 314 is configured to secure annular ring 310 onto locking lug 80 by closing gap 312.

During use, annular ring 310 is placed over locking lug 80 (FIG. 1) and closure mechanism 314 secures annular ring 310 around locking lug 80. Support 302 extends from annular ring 310 such that mirror 304 is positioned to enable an operator of skid loader 20 (FIGS. 1 and 6) to visualize substantially an entirety of a tail swing path 190 (FIG. 6) on either side of skid loader 20.

Figure 9:
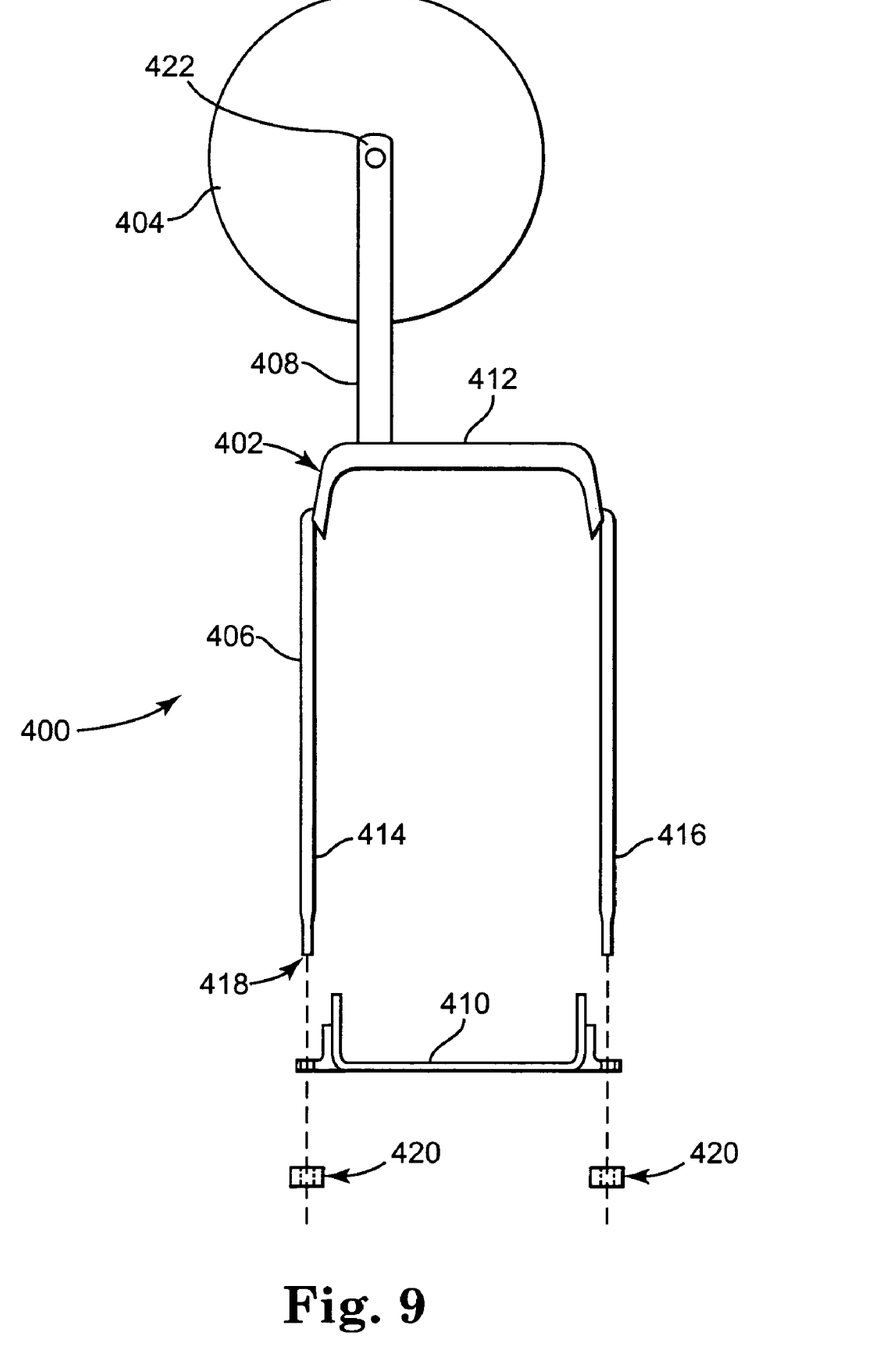
FIG. 9 illustrates a view of an exterior mirror mechanism including a support that defines a U-shaped brace according to one embodiment of the present invention.

FIG. 9 illustrates an exterior rearview mirror mechanism 400 according to another embodiment of the present invention. Exterior rearview mirror mechanism 400 includes a support 402 and a mirror 404 coupled to support 402. In one embodiment, support 402 includes a U-shaped brace 406, a mirror stand 408 extending from brace 406, and a bracket 410 adapted for coupling onto brace 406.

In one embodiment, U-shaped brace 406 defines a base 412, and a first brace leg 414 and a second brace leg 416 that extend from base 412 to define an open end 418. In one embodiment, open end 418 is sized to receive and slide over a width of lifting arm 30 (FIG. 1).

In one embodiment, bracket 410 includes fasteners 420, where bracket 410 and fasteners combine to form a closure about open end 418 of brace 406. In one embodiment, fasteners 420 are nuts that thread over a threaded portion of brace legs 414, 416.

In one embodiment, mirror stand 408 extends from brace 406 and terminates in a mirror end 422, where mirror end 422 is configured to couple with mirror 404. In this regard, mirror end 422 is similar to mirror end 106 (FIG. 2).

In one embodiment, support 402 is configured to provide a universal attachment means for attaching exterior rearview mirror mechanism 400 to a lifting arm of a skid loader. For example, U-shaped brace 406 and bracket 410 combine to form an assembly that is attachable to a variety of locations on lifting arm 32 (FIG. 1), for example, or support 250 (FIG. 7), for example, of a general skid loader.

Although specific embodiments have been illustrated and described, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claim and the equivalents thereof.

What is claimed is:

1. An exterior rearview mirror mechanism for a skid loader comprising:
   a support configured to extend from a movable lifting arm of the skid loader, the skid loader including a central axis and first movement means on a first side of the skid loader and second movement means on an opposing second side of the skid loader, the first movement means operable independently of the second movement means in a manner configured to rotate the skid loader about the central axis to define a tail swing path of the skid loader, the movable lifting arm configured to move from a non-elevated position to an elevated position; and
   a mirror attached to the support and thus elevated above and opposite the movable lifting arm, the mirror movable with the lifting arm and positioned to enable an operator of the skid loader to visualize substantially an entirety of the tail swing path on either rear side of the skid loader when the movable lifting arm is in the elevated position.

2. The exterior rearview mirror mechanism of claim 1, wherein the support comprises a mirror end that defines a bore and an arm end opposite of the mirror end, the bore configured to accept a bolt extending from the mirror.

3. The exterior rearview mirror mechanism of claim 1, wherein the support comprises a mirror end and an arm end opposite of the mirror end, the arm end including an annular ring configured to couple around a lifting lug of the lifting arm.

4. The exterior rearview mirror mechanism of claim 3, wherein the annular ring defines a gap and includes a closure mechanism extending across the gap, the closure mechanism configured to tighten the annular ring about the lifting lug.

5. The exterior rearview mirror mechanism of claim 1, wherein the movable lifting arm defines a width and the support comprises:
   a U-shaped brace defining a base and an open end;
   a mirror stand extending from the base; and
   a bracket configured to removably couple to the open end of the U-shaped brace;
   wherein when the support is attached to the skid loader, the open end of the U-shaped brace straddles the width of the movable lifting arm and the bracket extends across at least the width of the movable lifting arm to secure the brace to the movable lifting arm.

6. The exterior rearview mirror mechanism of claim 1, wherein the support comprises a vibration dampener.

7. The exterior rearview mirror mechanism of claim 6, wherein the vibration dampener comprises a separate mass attached to the support.

8. The exterior rearview mirror mechanism of claim 6, wherein the vibration dampener comprises a spring.

9. The exterior rearview mirror mechanism of claim 1, wherein the support is magnetically coupled to and extends from the movable lifting arm of the skid loader.

10. The exterior rearview mirror mechanism of claim 1, wherein the mirror defines a back side and a convex mirrored surface opposite the back side.

11. An exterior rearview mirror mechanism for a skid loader comprising:
   a support configured to extend from a lifting arm assembly of the skid loader, the support defining a support length and the skid loader including a central axis and first movement means on a first side of the skid loader and second movement means on an opposing second side of the skid loader, the first movement means operable independently of the second movement means in a manner configured to rotate the skid loader about the central axis to define a tail swing path of the skid loader, the lifting arm assembly configured to move to an elevated position; and
   a mirror attachable to an end of the support opposite the lifting arm assembly such that the attached mirror extends by about the support length away from the lifting arm assembly and is positioned to enable an operator of the skid loader to visualize substantially an entirety of the tail swing path on either rear side of the skid loader when the lifting arm assembly is in the elevated position.

12. The exterior rearview mirror mechanism of claim 11, wherein the support is configured to extend from a movable lifting arm of the lifting arm assembly.

13. The exterior rearview mirror mechanism of claim 11, wherein the support is configured to extend from a substantially fixed portion of a support structure of the lifting arm assembly.

14. The exterior rearview mirror mechanism of claim 11, wherein the lifting arm assembly includes a lifting arm that defines a width and the support comprises:
   a U-shaped brace defining a base and an open end; and
   a bracket;
   wherein the open end of the U-shaped brace is configured to straddle the width of the lifting arm of the lifting arm assembly and the bracket is configured to extend across at least the width of the lifting arm and attach to the open end of the U-shaped brace in securing the support to the lifting arm.

15. The exterior rearview mirror mechanism of claim 11, wherein the support comprises an annular ring configured to encompass a lifting lug of the lifting arm assembly.

16. The exterior rearview mirror mechanism of claim 15, wherein the annular ring defines a gap and includes a closure mechanism extending across the gap, the closure mechanism configured to close the gap and tighten the annular ring about the lifting lug.

17. A method of equipping a skid loader for improved rearward viewing, the method comprising:
   providing an exterior rearview mirror mechanism;
   providing the skid loader including a central axis and first movement means on a first side of the skid loader and second movement means on an opposing second side of the skid loader, the first movement means operable independently of the second movement means in a manner configured to rotate the skid loader about the central axis to define a tail swing path of the skid loader,
   attaching the exterior rearview mirror mechanism to a lifting arm assembly of the skid loader; and
   providing, with the exterior rearview mirror mechanism, a seated operator of the skid loader with a view of substantially an entirety of the tail swing path on either rear side of the skid loader with the lifting arm assembly elevated.

18. The method of claim 17, wherein the exterior rearview mirror mechanism includes a support configured to extend from the lifting arm assembly of the skid loader and a mirror attached to the support opposite the lifting arm assembly.

19. The method of claim 18, wherein the support is configured to extend from a movable lifting arm of the lifting arm assembly.

20. The method of claim 17, wherein providing an exterior rearview mirror mechanism comprises providing a first of a pair of exterior rearview mirror mechanisms, and the method further comprises providing a second of a pair of exterior rearview mirror mechanisms, each of the pair of exterior rearview mirror mechanisms being removably attachable to an opposing lifting arm assembly of the skid loader.

\* \* \* \* \*